(12) United States Patent
Scorrano et al.

(10) Patent No.: US 11,928,507 B2
(45) Date of Patent: Mar. 12, 2024

(54) HW PROGRAMMABLE SIGNAL PATH EVENT-BASED DSP FOR SENSOR MIXED SIGNAL DEVICES

(71) Applicant: InvenSense, Inc., San Jose, CA (US)

(72) Inventors: Matteo Scorrano, Corbetta (IT); Daniele Giorgetti, Corbetta (IT)

(73) Assignee: InvenSense, Inc., San Jose, CA (US)

( * ) Notice: Subject to any disclaimer, the term of this patent is extended or adjusted under 35 U.S.C. 154(b) by 175 days.

(21) Appl. No.: 17/537,305

(22) Filed: Nov. 29, 2021

(65) Prior Publication Data

US 2023/0168931 A1    Jun. 1, 2023

(51) Int. Cl.
*G06F 9/50*      (2006.01)
*G06F 9/48*      (2006.01)

(52) U.S. Cl.
CPC .......... *G06F 9/5005* (2013.01); *G06F 9/4881* (2013.01)

(58) Field of Classification Search
CPC . G06F 9/48; G06F 9/50; G06F 9/5005; G06F 9/4881
USPC .......................................................... 341/126
See application file for complete search history.

(56) References Cited

U.S. PATENT DOCUMENTS

| 2010/0030509 | A1* | 2/2010 | Crain, II | G06F 5/01 |
| | | | | 702/123 |
| 2015/0365220 | A1* | 12/2015 | Sultenfuss | H04L 5/0096 |
| | | | | 370/536 |
| 2016/0301512 | A1* | 10/2016 | Sultenfuss | G06Q 10/06 |
| 2019/0324444 | A1* | 10/2019 | Cella | G05B 19/4183 |

* cited by examiner

*Primary Examiner* — Lam T Mai
(74) *Attorney, Agent, or Firm* — DLA Piper LLP (US)

(57) ABSTRACT

A hardware-programmable digital signal path component for processing events from sensor mixed signal devices. A system includes a mixed signal component and a reconfigurable signal path component. The mixed signal component includes a group of sensor devices and generates one or more events from among the group of sensor devices. The signal path component receives the event(s), and includes a control unit component and a digital signal processor (DSP) component. The control unit component includes a programmable function enable mechanism, and distributes the received event(s) in combination with one or more functions among a set of predefined functions enabled by the programmable function enable mechanism. The DSP component is configured to perform one or more operations associated with the distributed event(s) in accordance with the enabled function(s).

20 Claims, 12 Drawing Sheets

HW PROGRAMMABLE SIGNAL PATH EVENT-BASED DSP FOR SENSOR MIXED SIGNAL DEVICES

TECHNICAL FIELD

The present disclosure generally relates to mixed signal systems and, in particular, to a hardware (HW)-programmable signal path event-based digital signal processor (DSP) for sensor mixed signal devices that can be re-used for multiple applications.

BACKGROUND

A signal path integrated circuit (IC) may be defined as a digital component utilized to elaborate (i.e., perform one or more mathematical operations on) and/or filter data from at least one external source, typically via an analog-to-digital converter (ADC) component. A conventional signal path component is typically realized with a mathematical core and a control unit, and designed as a custom-made hardware component specially configured for a specific project. As a consequence, a completely new design and verification effort (e.g., verification resources) are used for each signal path implementation (e.g., to accommodate one or more sensors, design changes, operations to be performed, one or more specific verifications to be performed, etc.). Additional design and verification challenges exist for signal path components associated with mixed signal devices. This is due to the increasing configuration and operation complexities involved in mixed signal devices, that often involve multiple data sources (e.g., sensors) and different interfaces to feed with elaboration results determined by the signal path component.

Accordingly, there is a need for improved signal path components for mixed signal devices.

SUMMARY

Aspects of the present disclosure relate to mixed signal systems. A system includes a mixed signal component and at least one reconfigurable signal path component in electronic communication with the mixed signal component. The mixed signal component includes a group of sensor devices. The mixed signal component is configured to generate one or more events from among the group of sensor devices. The at least one reconfigurable signal path component is configured to receive the one or more events. The at least one reconfigurable signal path component includes a control unit and a digital signal processor (DSP) component. The control unit includes a programmable function enable mechanism. The control unit component is configured to distribute the one or more received events in combination with one or more functions among a set of predefined functions enabled by the programmable function enable mechanism. The DSP component is configured to perform one or more operations associated with the distributed one or more events in accordance with the one or more enabled functions.

Aspects of the present disclosure also relate to methods of operating a signal path component of a mixed signal system. A method includes: receiving, by at least one reconfigurable processing component, one or more events generated from among a group of sensor devices comprising a mixed signal component; enabling, by a programmable function enable mechanism of the of the at least one reconfigurable processing component, one or more functions among a set of predefined functions; distributing, by a control unit component of the at least one reconfigurable processing component, the one or more received events in combination with the one or more functions enabled by the programmable function enable mechanism, and performing, by a digital signal processor (DSP) component of the at least one reconfigurable processing component, one or more operations associated with the distributed one or more events in accordance with the one or more enabled functions.

BRIEF DESCRIPTION OF THE DRAWINGS

Examples of a HW-programmable digital signal path component and methods of operating a HW-programmable digital signal path component are shown in the accompanying drawings.

DETAILED DESCRIPTION

Figure 1:
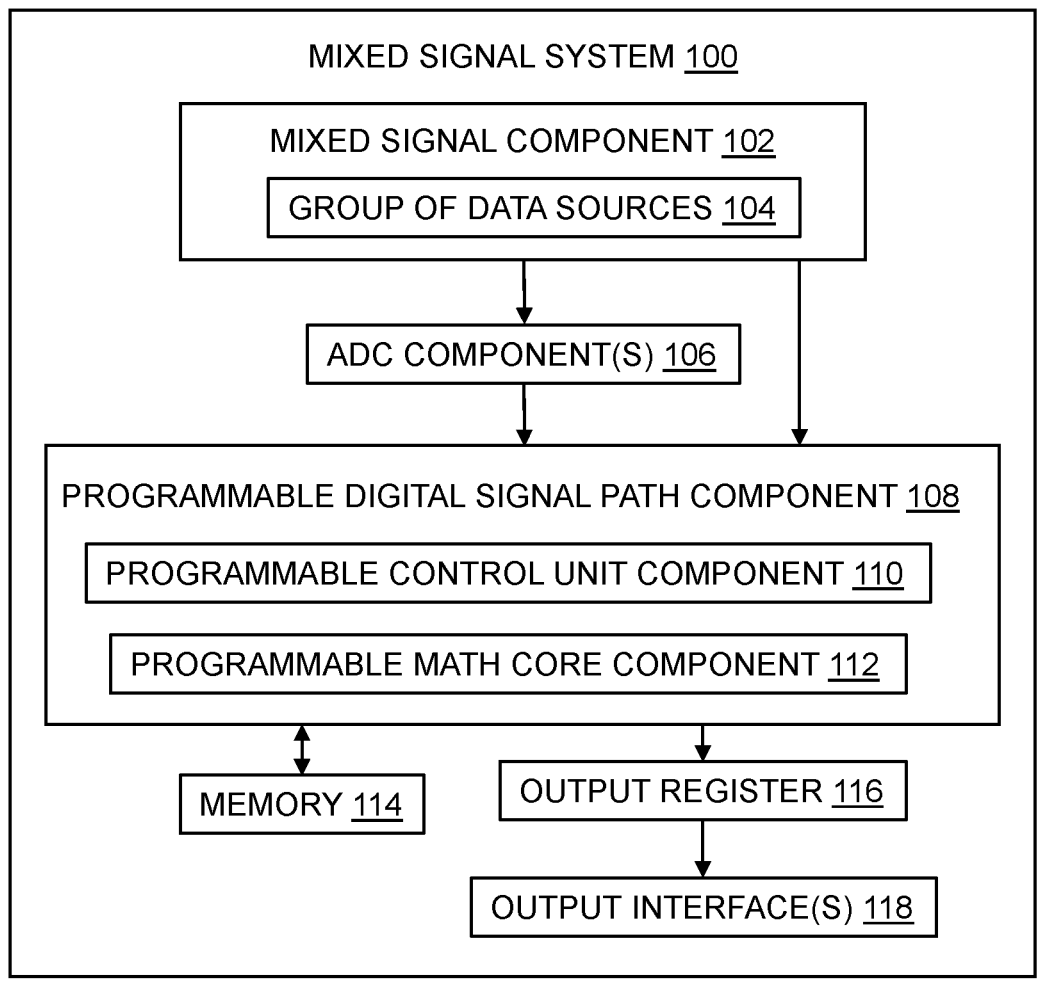
FIG. 1 is a functional block diagram of an example mixed signal system, according to an aspect of the present disclosure.

Aspects of the present disclosure will now be described more fully hereinafter with reference to the accompanying drawings in which example embodiments are shown. In the following description, for purposes of explanation, numerous specific details are set forth in order to provide a thorough understanding of the various embodiments. However, the present disclosure may be embodied in many different forms and should not be construed as limited to the example embodiments set forth herein.

As discussed above, conventional signal path technologies utilize custom designed circuits to perform elaboration and/or filtering of data from data sources. These technologies are specially configured for a specific application and, thus, may not be re-used for any other implementation. Some conventional technologies may utilize hardware sharing-type architectures. However, hardware-sharing architectures are generally extremely customized (e.g., for a specific application), provide minimal (if any) reusability for different applications and have a strict execution time (e.g., one output data rate (ODR)). Conventional signal path technologies may also utilize an internal memory for the DSP component. However, the use of an internal memory may provide limited flexibility for chip design in terms of power domain optimization.

In contrast, aspects of the present disclosure relate to a hardware-programmable digital signal path component for mixed signal devices that can be re-used for multiple (e.g., different) applications, and that is configured to handle asynchronous events from multiple mixed signal devices (e.g., events with different timing constraints). The programmable signal path component of the present disclosure includes a programmable control unit component (via a configurable and programmable function enable mechanism) and a programmable DSP component, thereby providing the ability to re-use the signal path component for various applications. In some examples, the programmable signal path component may include a control unit to handle asynchronous events from mixed signal devices (via an asynchronous First In, First Out (FIFO) configuration discussed further below), thereby allowing the signal path component to handle different timing constraints. In some examples, the signal path component may include an external memory (e.g., usable in a different power island). Utilization of an external memory block adds flexibility to the design of the component, such as in terms of power domain optimization. In some examples, the signal path component may be configured to elaborate one or more low priority functions from among one or more external sources (e.g., sensors, microprocessors, other external blocks, etc.). In some examples, the signal path component may utilize programmability via metal.

In some examples, a mixed signal system of the present disclosure may include a mixed signal component including a group of sensor devices and a reconfigurable signal path component. The mixed signal component may generate one or more events from among the group of sensor devices. The signal path component may include a control unit component having a programmable function enable mechanism and a DSP component. The control unit component may be configured to distribute the event(s) (received from the mixed signal component) in combination with one or more functions among a set of predefined functions enabled by the programmable function enable mechanism. The DSP component may be configured to perform one or more operations associated with the distributed event(s) in accordance with the enabled function(s).

In an embodiment, the programmable function enable mechanism may include programmable microcode stored in at least one look up table (LUT). The programmable microcode may include instructions for enabling implementation of the function(s) among the set of predefined functions by the DSP component.

In an embodiment, the DSP component may include programmable microcode stored in at least one LUT, such that the DSP component is reconfigurable.

In an embodiment, the mixed signal system may include at least one external memory coupled to the at least one reconfigurable signal path component.

In an embodiment, the reconfigurable signal path component may include two or more reconfigurable signal path components in electronic communication with the mixed signal component.

In an embodiment, the mixed signal component includes at least one input component configured to generate at least one event among the one or more events.

In an embodiment, the control unit component may include an event FIFO component and a function enable generator. The event FIFO component may be configured to store the received event(s) in a predefined sequence. The function enable generator may include the programmable function enable mechanism and may be configured to generate one or more function enable indications corresponding to the one or more functions.

In an embodiment, the function enable generator may be configured to distribute the stored event(s) to the DSP component together with the one or more function enable indications according to the predefined sequence and based on the one or more operations to be performed by the DSP component in the predefined sequence.

In an embodiment, the group of sensor devices may include different timing constraints such that the generated one or more events include one or more asynchronous events. The event FIFO component may be configured to arrange the asynchronous event(s) for storage in the FIFO component, and may schedule distribution of the one or more asynchronous events according to the predefined sequence.

In an embodiment, the FIFO component may include an event priority manager, an event FIFO component and an event read controller. The event priority manager may be configured to generate the predefined sequence and push the asynchronous event(s) according to the predefined sequence. The predefined sequence may be generated according to at least one of a temporal order and a predefined priority ranking of the one or more asynchronous events. The event FIFO component may be configured to store the pushed asynchronous event(s) according to the predefined sequence, to form one or more stored events. The event read controller may be configured to read at least one event among the stored event(s) in the event FIFO component according to the predefined sequence and send the at least one event to the function enable generator, when the DSP component is idle.

In an embodiment, the mixed signal system may include an event manager configured to send a request to the DSP component for operation of at least one function, where the request may be generated when the DSP component is idle and the FIFO component is empty. The at least one function may have a predefined priority and may be received from at least one external source.

In an embodiment, the control unit component may include a configuration manager component configured to sample one or more input settings of the mixed signal component.

In an embodiment, the reconfigurable signal path component may be configured to be programmed via metal.

In an embodiment, a method may include receiving, by at least one reconfigurable processing component, one or more events generated from among a group of sensor devices comprising a mixed signal component; enabling, by a programmable function enable mechanism of the at least one reconfigurable processing component, one or more functions among a set of predefined functions; distributing, by a control unit component of the at least one reconfigurable processing component, the one or more received events in combination with the one or more functions enabled by the programmable function enable mechanism, and performing, by a digital signal processor (DSP) component of the at least one reconfigurable processing component, one or more operations associated with the distributed one or more events in accordance with the one or more enabled functions.

Aspects of the present disclosure relate to a hardware-programmable signal path component. The signal path component may provide one or more instances of a re-usable and programmable signal path (e.g., for one or more related and/or different applications). In some examples, the signal path component may include digital hardware that may be designed and verified (e.g., only once). In some examples, the signal path component may include multiple programs stored in LUTs (e.g., as part of the function enable generator and the DSP component). In some examples, the signal path component may be designed to define programs, generic registers and generic inputs to match each project. In some examples, the signal path component may provide a full flexibility on sensor allocation per hardware unit and task priority. In some examples, the signal path component may be configured to run externally requested low priority functions, as well has handle events from one or more mixed signal devices.

In some embodiments, the digital signal path component may be configured to provide a unique DSP component shared among all of the input components (e.g., sensors, other data sources and/or other external elaborators), even though these input components may operate on different sequences and/or different (and possibly uncorrelated) ODR grids. In a non-limiting example, a mixed signal system may include multiple (e.g., three) sensors, each operating at an independent rate and power mode. In addition, the mixed signal system may include multiple (e.g., three) different output interfaces to be fed by each of the (e.g., three) sensors. A frequency and data full scale of each output interface may be independent with respect to the same parameters of the other interfaces. A digital signal path component according to the present disclosure may be created, with a single hardware, to execute and handle all the requested elaborations for the above group of sensors and output interfaces. The signal path component may be designed to be generic and configurable in order to extend the usage to any number of input components (e.g., sensors) and output interfaces (associated with one or more output components).

In some examples, the digital signal path component of the present disclosure may be configured to perform one or more mathematical operations on data (e.g., events) from one or more input data interfaces (associated with one or more data sources) according to one or more functions programmed by the user, and provide results of the operations to one or more output interfaces. In some examples, a parametric number of functions may be added to programmable µcode of the DSP component, where each of the functions may be associated with a portion of the DSP µcode. In addition, a condition to enable a specific function may be programmed with its own µcode, as part of µcode associated with the function enable generator of the signal path component. In general, the signal path component of the present disclosure may provide several degrees of programmability (e.g., via the programmability of both the control unit component and DSP component). Moreover, the ability to reconfigure the signal path component itself makes it possible to obtain different solutions for a same problem, thereby providing more design flexibility during a project (even late in the project) to optimize area, power, etc. In some examples, the entire µcode logic may be configured as a separate black box, programmable via metal.

Hardware-programmable signal path components of the present disclosure may provide advantages over conventional technologies. First, the programmable (reconfigurable) signal path component may reduce the need for new digital design and verification efforts. The same signal path component may be re-used for a large range of applications (e.g., DSP, motion sensors, microphones etc.). In addition, the signal path component may provide asynchronous event handling. For example, the asynchronous event FIFO component allows processing (with the same hardware) of any data coming from independent and asynchronous sources. Yet further, the programmable signal path component may be configured for automatic implementation of a digital design through dedicated hardware description language (HDL) HDL code and read-only memory (ROM) generation flow, and an ability to map a customized portion of a design (e.g., one or more functions for a particular application) into a ROM or metal programmable array. Still, further the signal path component may be configured such that a core of the component may be fully verified separately, leaving any system matching to be performed at a project level.

Signal path components of the present disclosure may also provide commercial benefits. For example, the signal path component may be used as part of any system and/or device that utilizes one or more DSP units. In some examples, the signal path component may be used as a central signal path calculation block and/or as a co-processor.

Referring now to FIG. 1, a functional block diagram of example mixed signal system 100 (also referred to herein as system 100) is shown. System 100 may include mixed signal component 102, one or more ADC components 106, programmable digital signal path component 108, external memory 114, output register 116 and one or more output interfaces 118. Programmable digital signal path component 108 (also referred to herein as signal path component 108) may be in electrical communication with mixed signal component 102 directly, and/or via ADC component(s) 106. Signal path component 108 may also be in electrical communication with external memory 114 and output register 116. Output register may be in electrical communication with output interface(s) 118.

Mixed signal component 102 may include group of data sources 104 configured to generate one or more data source events (e.g., responsive to an external stimuli, an output from another device and the like). In some examples, group of data sources 104 may include a group of mixed signal devices (e.g., having independent operation parameters (such as rate, power mode, etc.). In some examples, the group of sensor devices may include a group of microelectromechanical systems (MEMS) sensors. In some examples, a data source 104 may include, without being limited to, a sensor device, another data source (e.g., an ODR component, a device and/or system controller, a user interface, etc.) and/or an external elaborator and/or any other suitable input component configured to generate one or more events to be elaborated by signal path component 108. In a non-limiting example, a sensor device may include one or more of an acoustic sensor, a microphone, an accelerometer, a gyroscope, a pressure sensor, a temperature sensor, a fingerprint sensor and a magnetometer. In some examples, mixed signal component 102 may generate one or more analog output signals, one or more digital output signals and/or a combination thereof.

ADC component(s) 106 may be configured to convert one or more analog output signals (representing source events) from mixed signal component 102 to one or more corresponding digital signals (representing digital source events). In some examples, one or more of ADC component(s) 106 may be integrated with mixed signal component 102. In some examples, one or more of ADC component(s) 106 may be a separate component from mixed signal component 102. In general, ADC component(s) 106 may be configured to provide digital output signal(s) to signal path component 108.

Programmable digital signal path component 108 may include programmable control unit component 110 (also referred to herein as control unit component 110) and programmable math core component 112 (also referred to herein as math core component 112). Each of control unit component 110 and math core component 112 may be configured to be programmed (e.g., via corresponding µcode), such that signal path component may be reconfigurable and re-used for various applications.

Control unit component 110 may be configured to store (digital) source event(s) (e.g., received from among group of data sources 104 via ADC component(s) 106 and/or directly from mixed signal component 102) while the math core component 112 is busy performing one or more mathematical operations. Math core component 112 may be configured to perform one or more mathematical operations (in accordance with one or more programmed functions) and may send elaboration results to output register 116. Control unit component 110 may be configured to store source events and control the distribution of the stored source event(s), including asynchronous events, to math core component 112 in accordance with one or more enabled predefined functions (based on programming of control unit component 110).

Figure 2:
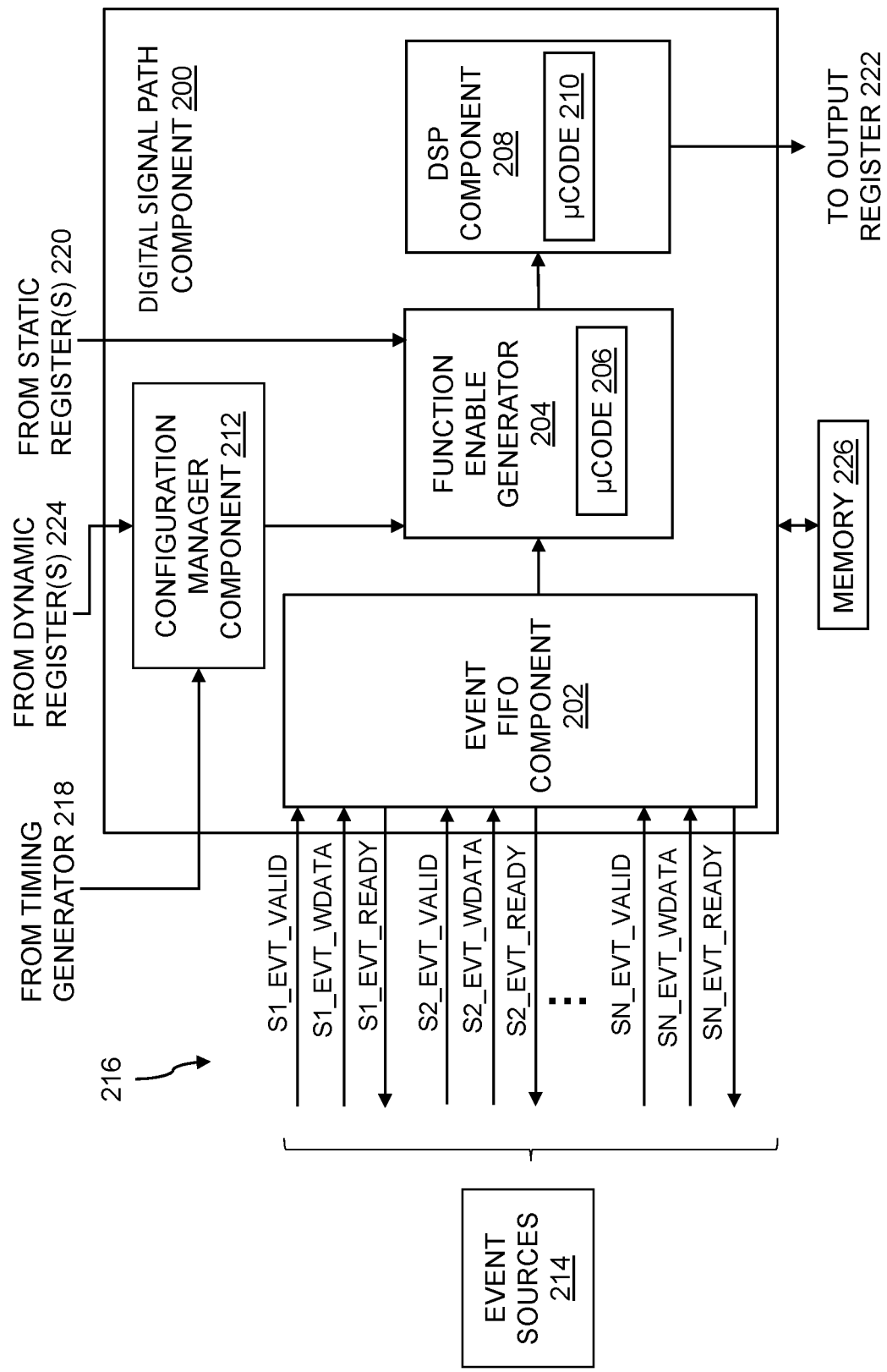
FIG. 2 is a functional block diagram of an example digital signal path component, according to an aspect of the present disclosure.

An example of control unit component 110 may be represented by event FIFO component 202, function enable generator 204 and configuration manager component 212 shown in FIG. 2. An example of math core component 112 may be represented by DSP component 208 shown in FIG. 2. Signal path component 108 is described further below with respect to FIG. 2.

External memory 114 may be configured to store one or more predetermined functions, parameters, conditions, values and/or any other suitable information that may be used for operation of math core component 112 and/or control unit component 110.

Output register 116 may be configured to receive and store elaboration results from math core component 112, which elaboration results may be associated with one or more among group of data sources 104. Output register 116 may be configured to distribute the stored elaboration results to one or more among output interface(s) 118.

Output interfaces(s) 118 may be associated with one or more output components (not shown) configured to receive one or more elaboration results from among group of data sources 104. In some examples, output interface(s) 118 may represent different output interfaces having similar and/or different operation parameters (e.g., frequency, data scale, etc.). In general, an output component may include any suitable device (e.g., analog and/or digital) which may utilize the elaboration results associated with one or more of group of data sources 104 (e.g., for display, for further processing, for transmission to another entity, for storage and the like).

FIG. 2 is a functional block diagram of example digital signal path component 200 (also referred to herein as signal path component 200). Signal path component 200 may include event FIFO component 202, function enable generator 204 having programmable µcode 206, DSP component 208 having programmable µcode 210 and configuration manager component 212. Event FIFO component 202 of signal path component 200 may receive one or more events 216 from among event sources 214. In some examples, event FIFO component 202, function enable generator 204 and configuration manager component 212 may collectively represent programmable control unit 110 (FIG. 1) and DSP component 208 may represent programmable math core component 112 (FIG. 1). Signal path component 200 may be configured to be in electrical communication with (external) memory 226. Memory 226 is similar to memory 114 (FIG. 1).

In FIG. 2, event sources 214 represent an N number of event sources (i.e., S1, S2, . . . , SN), where N represents an integer greater than or equal to 1. Event sources 214 represent an example of group of data sources 104 (FIG. 1), and events 216 represent an example of output signals from group of data sources 104 after any analog-to-digital conversion (e.g., via ADC component(s) 106 of FIG. 1). In FIG. 2, each event source 214 is illustrated as transmitting events 216 to signal path component 200 according to a handshake process.

In the example shown in FIG. 2 (and FIGS. 5 and 6), the handshake process includes a valid/ready protocol. In general, the valid/ready protocol may ensure that data passes from a source (e.g., S1) to a recipient (e.g., Event FIFO component 202) when the source has valid data to pass and when the recipient is ready to receive the data. In the valid/ready protocol, data is transferred to the recipient when the valid signal transmitted by the source and the ready signal transmitted by the recipient signal are both high. In FIG. 2, the event valid ("EVT_VALID") signal (transmitted by an event source such as S1) and the event ready ("EVT_READY") signal (transmitted by event FIFO component 202) represent respective valid and ready handshaking signals, and the event with data ("EVT_WDATA") signal represents event data for an event associated with an event source (such as source 1). In other words, an event 216 for an event source 214 may include the event signal as well as a pair of handshaking signals. For example, source S1 (among event sources 214) may transmit handshaking signal S1_EVT_VALID, and may receive S1_EVT_READY handshaking signal from event FIFO component 202. When both the valid and ready handshaking signals are high, source S1 may transmit event signal S1_EVT_WDATA to event FIFO component 202. Although a valid/ready protocol is illustrated, it is understood that the valid/ready protocol represents a non-limiting protocol, and that events 216 may be transmitted from event sources 214 to signal path component 200 via any suitable handshake protocol.

Event FIFO component 202 may be configured to store any input data (such as event(s) 216) and flag the stored (event) data while DSP component 208 is busy (e.g., performing one or more mathematical operations in accordance with programmable µcode 210). In this manner, when DSP component 208 is ready (e.g., idle) and available to perform further operations, the storage provided by event FIFO component 202 makes it possible for DSP component 208 to process the data without a loss of information. In some examples, event FIFO component 202 may be configured to handle asynchronous event data. Examples of event FIFO component 202 are described further below with respect to asynchronous FIFO component 406 (FIG. 4) and FIFO component 506 (FIGS. 5A and 5B).

Function enable generator 204 may be configured to communicate with event FIFO component 202, DSP component 208 and communication manager component 212. Function enable generator 204 may receive a particular event from among event(s) 216 initially stored in event FIFO component 202. In some examples, function enable generator 204 may be configured to receive additional input data, such as from at least one static register 220. In some examples, static register(s) 220 may store information (e.g., filter settings, configurations and the like) that may have an impact on which function sets to run (e.g., in a current frame). Function enable generator 204 may be configured to generate one or more function enable signals, for the particular event, that is associated with one or more functions among a set of predefined functions. The set of predefined functions may be stored in programmable μcode 206. Because μcode 206 is programmable, function enable generator 204 may be programmed (and thus reconfigured and re-used) with one or more specific functions as desired (such as for different applications).

The function(s) enabled by the function enable signal(s) (for the particular event) may be selected to address a program counter offset selector linked to DSP component 208. The program counter offset selector may be utilized, by function enable generator 204 to run different portions of μcode 210 of DSP component 208 that may be associated with the particular event. Function enable generator 204 may be configured to distribute the particular event (and/or in some examples, additional input data) to DSP component 208 in accordance with the function enable signal(s). In general, event FIFO component 202 may transmit a particular (stored) event to function enable generator 204, and function enable generator 204 may distribute the particular event in accordance with the function enable signal(s). Overall, event(s) 214 and corresponding function enable signal(s) are provided to DSP component 208 in a particular sequence associated with a program order for portions of μcode 210 to be performed by DSP component 208.

DSP component 208 may be configured to receive event(s) distributed by function enable generator 204 together with corresponding function enable signal(s). DSP component 208 may be configured to perform one or more mathematical operations on the distributed events in accordance with function(s) enabled by the corresponding function enable signal(s) based on μcode 210, to form elaboration results. As with function enable generator 204, it is possible to program functions performed by DSP component 208 via through programmable μcode 210. In this manner, DSP component 210 (via μcode 210) may be programmed (and thus reconfigured and re-used) with one or more specific functions as desired (such as for different applications). DSP component 208 may transmit the elaboration results to output register 222.

Configuration manager component 212 may be configured to sample input settings of each event source(s) 214. For example, the input settings may be sampled based on an external strobe associated with an interface of an event source 214. In some examples, the input setting may be sampled (by configuration manager component 212) responsive to a request from timing generator 218. Timing generator 218 may be configured to manage the timing of a data path provided by signal path component 200 (e.g., from event sources 214 to output interface(s) such as output interface(s) 118 shown in FIG. 1), via generation of at least one ODR signal. The ODR signal may be used to generate output data by signal path component 200. For example, timing generator 218 may generate one or more enables of signal path chains and may determine when an output of each signal path sub-block should be generated. With respect to configuration manager component 212, timing generator 218 may determine a timing for resampling of any configuration registers (not shown). In some examples, configuration manager component 212 may be configured to re-time the input setting(s) according to a timing determined by timing generator 218. The re-timing may be used to keep coherence on DSP behavior, to align a timing setting change to an ODR event, in order to avoid a change during operation of DSP component 208 that may impact data quality.

Configuration manager component 212 may also be configured to communicate with at least one dynamic register 224. Dynamic register(s) 224, similar to static register(s) 220, may also store information that may have an impact on which functions to run (e.g., in a current frame). Both static register(s) 220 and dynamic register(s) 224 may access a register map (not shown). For example, the register map may be accessible by any suitable interface (e.g., a serial peripheral interface (SPI), an inter-integrated circuit (I2C), etc.). In general, static register(s) 220 may be "static" in that the register content may be changed by the host while DSP component 208 is off, but not while DSP component is running. Because the register content of static register(s) 220 may not be changed while DSP component 208 is on (e.g., running), it is possible for the register content to be provided directly to DSP component 208 during its run time without generating any discrepancies (e.g., spikes) on the data. The content of dynamic register(s) 224 may be changed at any time, including while DSP component 208 is running. Thus, it is possible for the data of dynamic register(s) 224 to be corrupted if any "on-the-fly" changes are not synchronized to a proper event from timing generator 218.

Figure 3A:
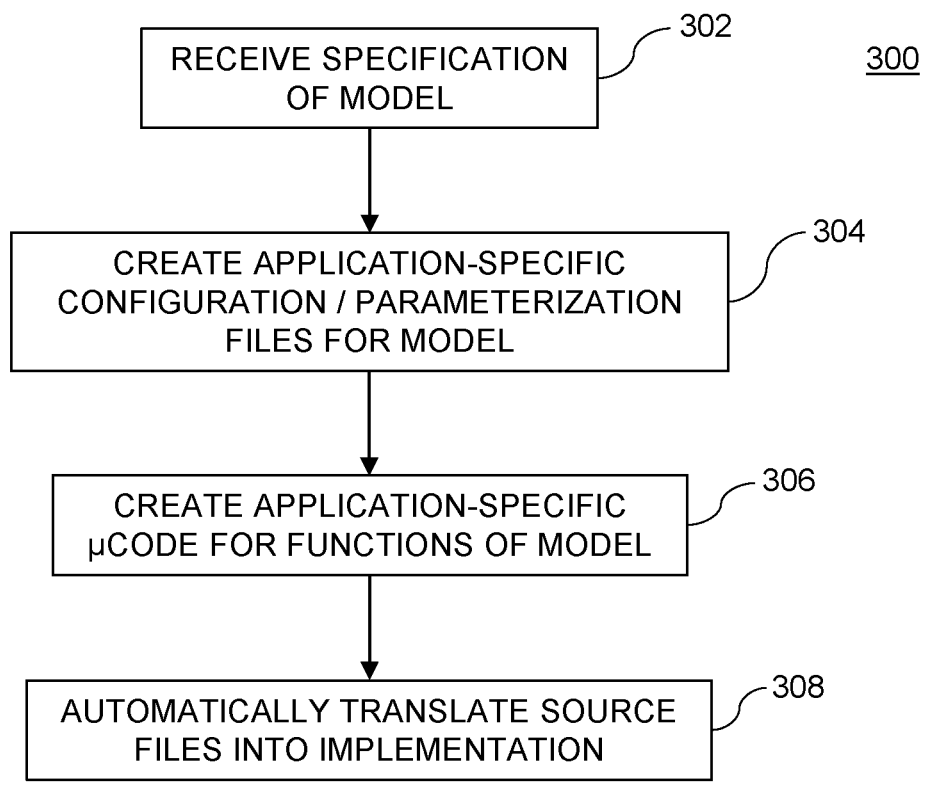
FIG. 3A is a flowchart diagram of an example method of programming a digital signal path component, according to an aspect of the present disclosure.
Figure 3B:
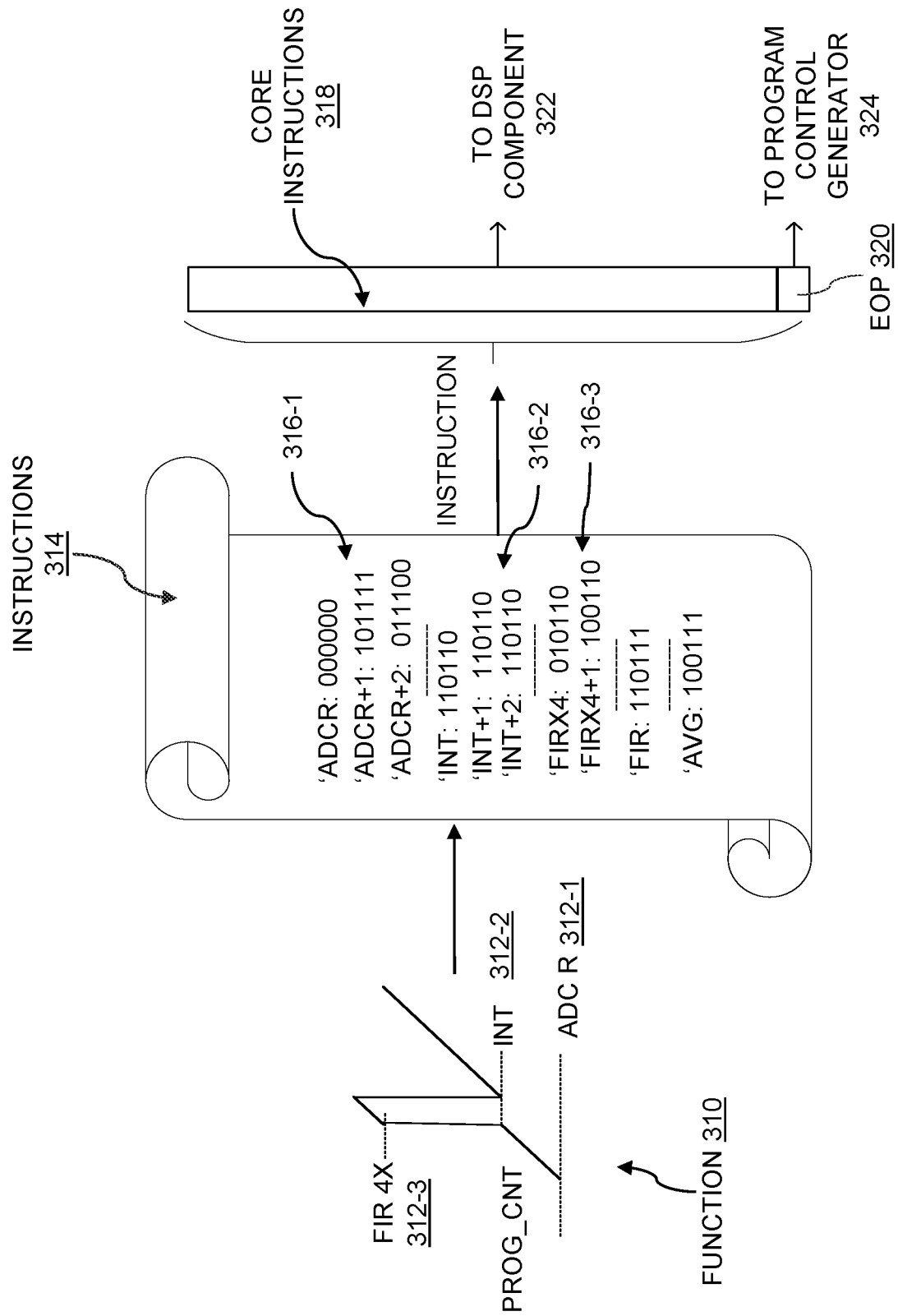
FIG. 3B is a schematic diagram illustrating an example of converting a function to core instructions, according to an aspect of the present disclosure.

Referring to FIGS. 3A and 3B, an example of programming a digital signal path component (such as signal path component 200 of FIG. 2) is shown. In particular, FIG. 3A is a flowchart diagram of example method 300 of programming a digital signal path component and FIG. 3B is a schematic diagram illustrating an example of converting a function (e.g., function 310) to core instructions 318.

Referring to FIG. 3A, at step 302, a specification of a model may be received. For example, a system team may specify one or more parameters and/or characteristics of the model. At step 304, an application-specific configuration and parameterization files may be created for the model (received at step 302). For example, application specific configuration/parameterization files may be created (such as by a designer) to properly size the hardware chip for a project.

At step 306, application-specific μcode may be created for functions of the model. At step 308, the source files may be automatically translated into a desired implementation. For example, the source files may be translated into HDL files and/or ROM content.

Referring next to FIG. 3B, an example of converting function 310 to core instructions 318 is shown. In FIG. 3B, PROG_CNT represents a program counter. In this example, function 310 includes three example portions (designated generally as 312). First portion 312-1 is associated with an example ADC reconstruction function. Second portion 312-2 is associated with an example interpolation function and third portion 312-3 is associated with an example finite impulse response (FIR) filter function.

Portions 312-1, 312-2, and 312-3 of function 310 may be converted to respective instruction portions 316-1, 316-2 and 316-3 among set of instructions 314. Set of instructions 314 may be converted into core instructions 318 (e.g., a program) having an end of procedure (EOP) 320. Core instructions 318 may be provided to DSP component 322. In FIG. 3B, core instructions 318 represents μcode (such as μcode 210 of DSP component 208 shown in FIG. 2). EOP 320 may be provided to program control generator 324. In general, the program counter (e.g., PROG_CNT) may start at zero (for example) and may be reset each EOP 320. An offset may be added to the program counter specified by the various parameters (e.g., ADCR, INT, FIR, etc.), so that the memory may be swept from the starting address of the function until EOP 320.

In some examples, core instructions 318 may be stored in a LUT. In some examples, the LUT that contains the program (core instructions 318) may be automatically generated as an HDL file and synthesized. Other options also exist to change the μcode later in a design and verification process. For example, binary μcode may be written into a ROM. Next, the LUT may be mapped on a metal-programmable array. Then, the binary μcode may be written into a one-time programmable (OTP) device. Although the use of an OTP device may be more expensive than a LUT, the OTP may be customizable later during the design/verification process (e.g., during production test).

Figure 4:
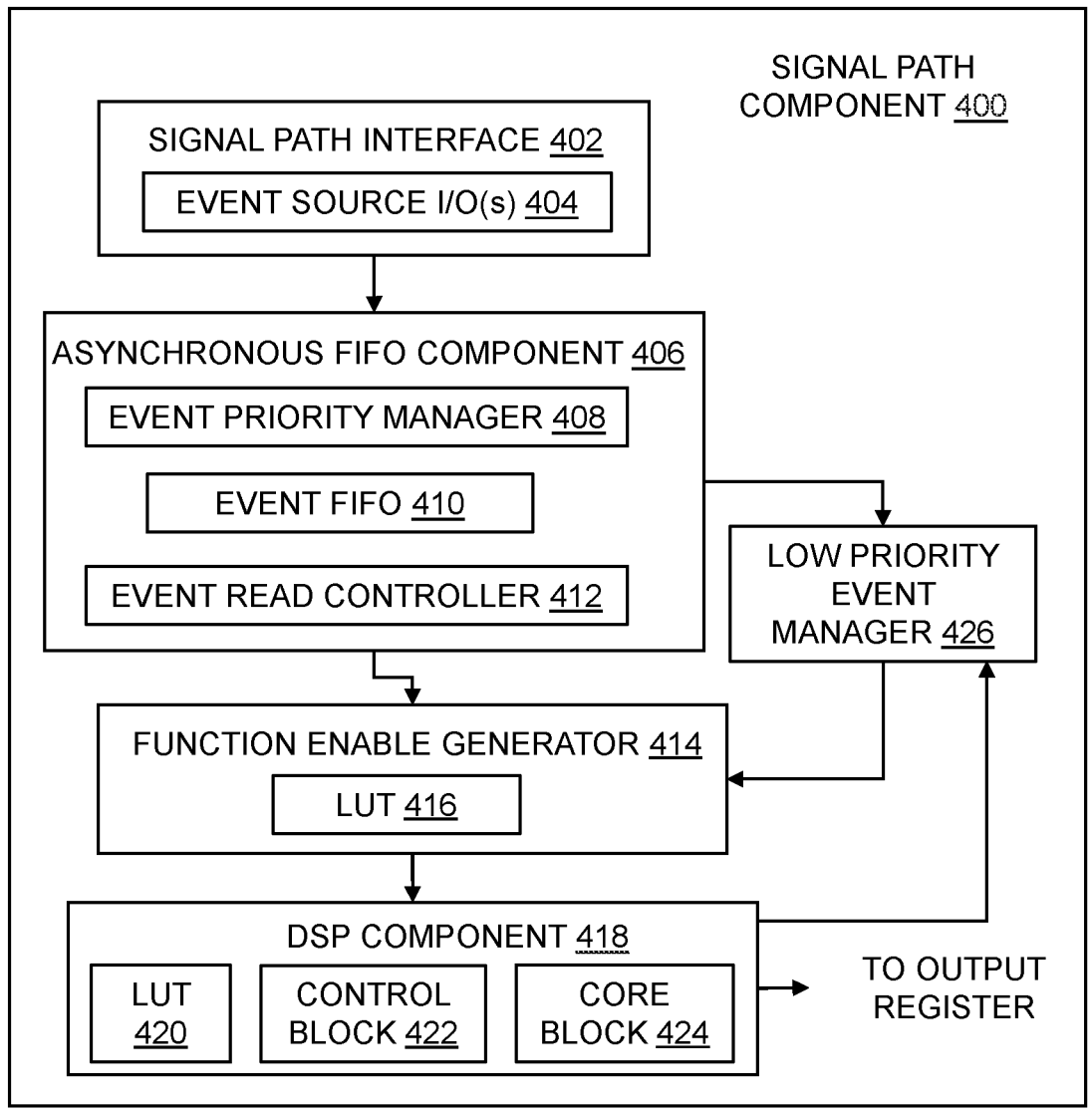
FIG. 4 is a functional block diagram of an example digital signal path component, according to another aspect of the present disclosure.
Figure 5A:
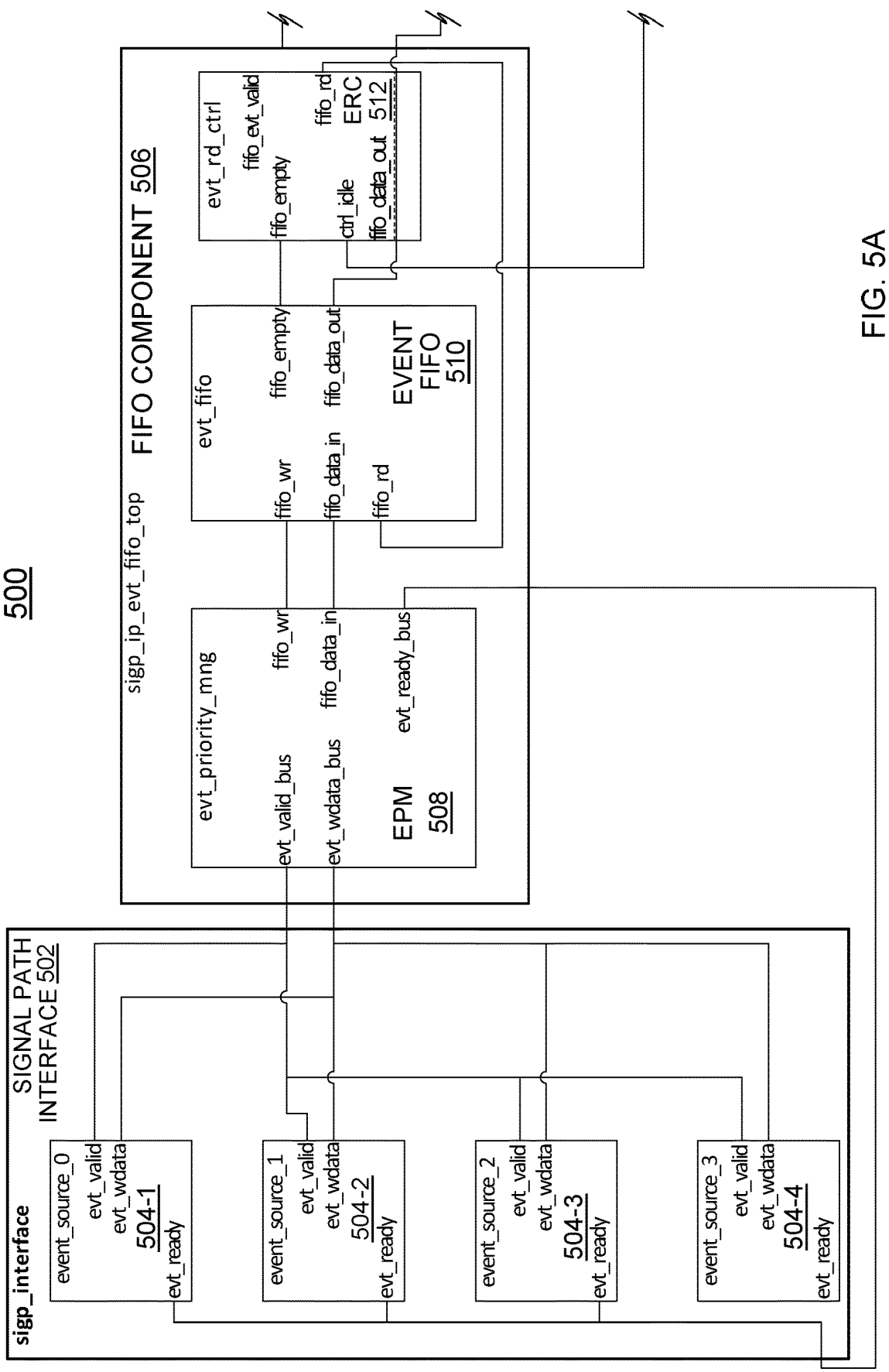
FIGS. 5A-5B are circuit diagrams of an example digital signal path component, according to an aspect of the present disclosure.
Figure 5B:
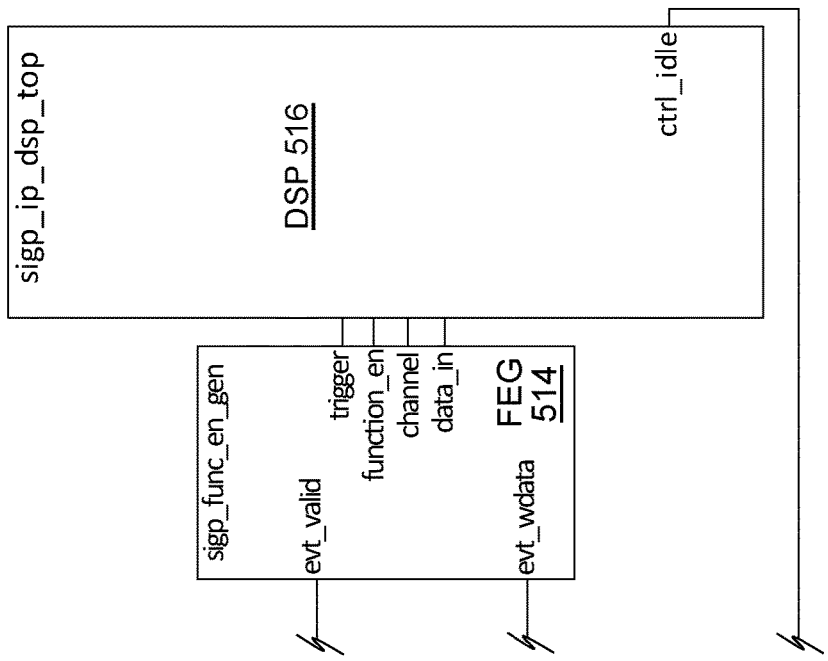
Figure 6:
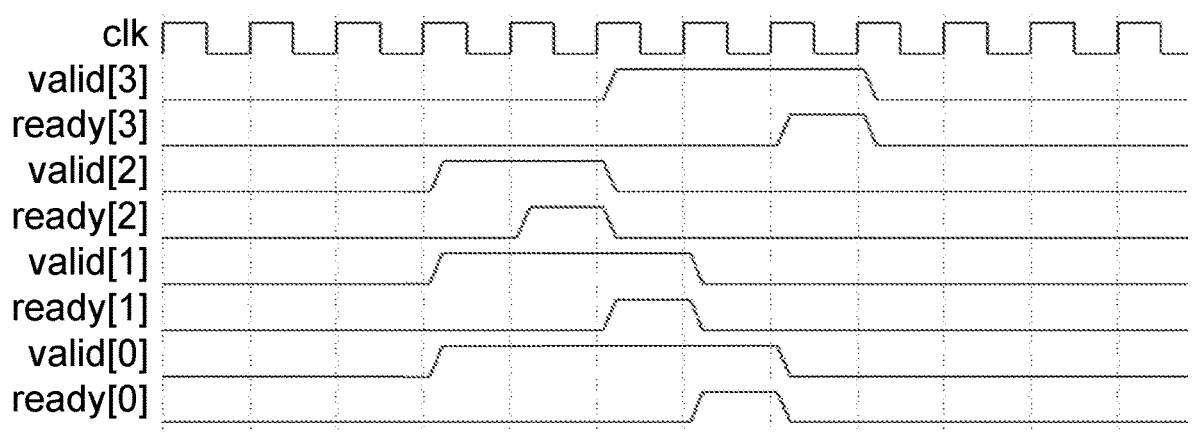
FIG. 6 is a block diagram of a group of digital waveforms illustrating example asynchronous events associated with multiple event sources, according to an aspect of the present disclosure.

Referring next to FIGS. 4-6, examples of a (digital) signal path component are described, according to an embodiment of the present disclosure. In particular, FIG. 4 is a functional block diagram of example signal path component 400; FIGS. 5A and 5B are circuit diagrams of example signal path component 500; and FIG. 6 is a block diagram of a group of digital waveforms 600 illustrating example asynchronous events associated with multiple event sources. Signal path component 500 represents an example implementation of signal path component 400. Although not shown in FIGS. 5A and 5B, components of signal path component 500 may be in communication with a clock signal (such as the "clk" signal shown among digital waveforms 600 in FIG. 6).

As shown in FIG. 4, signal path component 400 may include signal path interface 402, asynchronous FIFO component 406, function enable generator 414, DSP component 418 and low-priority event manager 426. Function enable generator 414 is similar to function enable generator 204 (FIG. 2), except that function enable generator 414 includes LUT 416 that may be configured to store μcode 206 (FIG. 2).

As shown in FIGS. 5A and 5B, signal path component 500 may include signal path interface 502 (an example of signal path interface 402), FIFO component 506 (an example of FIFO component 406), function enable generator (FEG) 514 (an example of function enable generator 414) and DSP 516 (an example of DSP component 418). Signal path component 500 illustrates control lines, such as "evt_valid", "evt_wdata", "evt_ready", "evt_valid_bus", "evt_wdata_bus" and "evt_ready_bus" on various components (e.g., signal path interface 502, FIFO component 506, FEG 514) that may be used as part of a valid/ready protocol for a handshaking process, as discussed above. Although signal path component 500 does not shown an example implementation of low priority event manager 426, this is simply for ease of illustration in FIGS. 5A and 5B. It is understood that, in some examples, signal path component 500 may include low priority event manager 426 (an example of such an implementation is described further below).

As shown in FIG. 4, signal path interface 402 may one or more event source input/output (I/O) interfaces, designated as event source I/O(s) 404. Event source I/O(s) 404 may be configured to receive/transmit a pair handshaking signals (as discussed above) and to receive events from event sources (such as event sources 214 shown in FIG. 2). In FIGS. 5A and 5B, signal path interface 502, illustrates an example embodiment of four event source I/O(s) 504 (e.g., 504-1, 504-2, 504-3 and 504-4). In a non-limiting example, event source I/O 504-1 may represent an interface with an accelerometer (after conversion via an ADC component such as ADC component(s) 106 shown in FIG. 1), event source I/O 504-2 may represent an interface with a gyroscope (after conversion via an ADC component such as ADC component(s) 106), event source I/O 504-3 may represent an interface with a user interface, and event source I/O 504-1 may represent an interface with an optical image stabilization controller.

As shown in FIG. 4, asynchronous FIFO component 406 may include event priority manager 408, event FIFO 410 and event read controller 412. In general, asynchronous FIFO component 406 may be configured to store asynchronous events (such as event(s) 216 shown in FIG. 2), while DSP component 418 is busy and distribute the stored events to DSP component 418 when DSP component 418 is idle.

Event priority manager 408 may be configured to push all the incoming asynchronous events (via signal path interface 402) to event FIFO 410, in accordance with at least one of temporal order and a predetermined event priority ranking. For example, event priority manager 408 may push events to event FIFO 410 in a sequence that respects a temporal order corresponding to receipt of each event (such as when events are received sequentially (e.g., at different times)). In some examples, more than one event may be received at the same time. In this case, a predetermined (e.g., hard-coded) event priority ranking may be used to determine the order in which the events are pushed to event FIFO 410. For example, where three events occur (i.e., are received) at the same time, event priority manager 408 may push the events in order of priority (e.g., a higher index first). Event priority manager 408 (in this example) may also push a higher priority event into event FIFO 410 after a lower priority event is pushed, when the lower priority event is received first, thus maintaining the temporal order (regardless of the event priority).

Event FIFO 410 may be configured as an asynchronous FIFO structure, to store asynchronous events while DSP component 418 is busy, so that stored events may be read when DSP component 418 becomes idle. Event FIFO 410 may also indicate whether event FIFO 410 is empty (e.g., when no events are stored in event FIFO 410). In some examples, event FIFO 410 may indicate when event FIFO 410 is full (e.g., when a storage capacity of event FIFO 410 has been reached and no more events can be stored in event FIFO 410). Event FIFO 410 may be configured to queue the events according to the order in which the events are received from event priority manager 408. Stored events may be read from event FIFO 410, in a sequential manner, such that a first event to arrive (input) may be the first event read (output) from event FIFO 410. In general, in an asynchronous FIFO, data values may be written to a FIFO buffer from a first clock domain, and the data values may be read from the same FIFO buffer from a second clock domain, and where the first and second clock domains are asynchronous to each other. Because event FIFO 410 may be configured as an asynchronous FIFO, event priority manager 408, event FIFO 410 and event read controller 412 may operate together according to an asynchronous data input/output protocol, that may include utilizing write clock and read clock control signals for respectively pushing (e.g., writing) events into event FIFO 510 and pulling (e.g., reading) events from event FIFO 510, in accordance with a clock signal (such as the "clk" signal shown among digital waveforms 600 in FIG. 6).

Event read controller 412 may be configured to read events from event FIFO 410, when event FIFO 410 is not empty and when DSP component 418 is idle. Event read controller 412 may thus monitor an operation status of DSP component 418, to determine whether DSP component 418 is idle. Event read controller 412 may also monitor a storage status of event FIFO 410, to determine whether event FIFO 410 is empty. Based on the monitored operation status of DSP component 418 and storage status of event FIFO 410, event read controller 412 may read an event from event FIFO 410, in an order as queued by event FIFO 410. Event read controller 412 may transmit the read event to function enable generator 414.

In FIGS. 5A abd 5B, FIFO component 506 illustrates an example embodiment of FIFO component 406. FIFO component 506 includes event priority manager (EPM) 508 (an example implementation of event priority manager 408), event FIFO 510 (an example implementation of event FIFO 410), and event read controller (ERC) 512 (an example implementation of event read controller 412). FIFO component 506 illustrates various control lines for storing events in event FIFO 510 and distributing (stored) events to DSP 516 (via FEG 514.

EPM 508 illustrates control lines "fifo_wr" and "fifo_data_in" for write clock and data in, respectively, which control lines (together with the corresponding control lines of event FIFO 510) may be used to write events to event FIFO 510 (via EPM 508) in accordance with a clock signal (such as the "clk" signal shown among digital waveforms 600 in FIG. 6). Event FIFO 510 illustrates control lines "fifo_wr", "fifo_data_in", "fifo_rd", "fifo_empty" and "fifo_data_out". Control lines "fifo_rd", "fifo_empty" and "fifo_data_out" represent respective control lines for read clock, empty status and data out. The read clock, empty, and data out control lines may be used to read events (stored in event FIFO (510), via ERC 512, when event FIFO is not empty, and in accordance with a clock signal (such as the "clk" signal shown among digital waveforms 600 in FIG. 6).

ERC 512 illustrates control lines "fifo_empty", "ctrl_idle" and "fifo_data_out". ERC 512 may use the "fifo_empty" to determine whether event FIFO 510 is empty. ERC 512 may use the "ctrl_idle" control line to determine whether DSP 516 is idle. When ERC 512 determines that DSP 516 is idle, ERC 512 may send an event (stored in event FIFO 510) to FEG 514, via the "fifo_data_out" control line (and according to handshaking process).

Referring back to FIG. 4, function enable generator 414 may be configured to receive an event from event read controller 412, and may determine one or more functions to be enabled, for the particular received event, in accordance with particular portion(s) of μcode (e.g., portions of programmable μcode 210 shown in FIG. 2) stored in LUT 420 of DSP component 418 associated with the particular event. The functions to be enabled may be determined from among a set of predefined functions stored in LUT 416 (e.g., μcode 206 (FIG. 2) stored in LUT 416. Function enable generator 414 may generate one or more function enable signals, for the particular event, for the associated function(s). Function enable generator 414 may transit the particular event together with the function enable signal(s) to DSP component 418.

In FIGS. 5A and 5B, FEG 514 illustrates an example embodiment of function enable generator 414. FEG 514 illustrates control lines "trigger", "function_en", "channel", "data_in" and "evt_wdata". The "function_en" and "data_in" control lines may be used to transmit the function enable signal(s) and a particular event, respectively, from FEG 514 to DSP 516. FEG 514 may receive a particular event from ERC 512 via "evt_wdata" control line. The "channel" control line represents at least one data channel (e.g., at least one input and/or output data channel. The "trigger" control line may be utilized to request that DSP 516 perform at least one operation on data other than events from FIFO component 506, such as data from an external data source. For example, FEG 514 may use the trigger control line to request operation of DSP 516 on low priority data (e.g., from low priority event manager 426). In some examples, low priority event manager 426 may provide FEG 14 at least one data packet that may contain a command code indicating a processor operation to be performed and the data to be processed by DSP 516. FEG 14 may transmit the data packet(s) to DSP 516 via the "trigger" control line.

Referring to FIG. 4, DSP component may include LUT 420, control block 422 and core block 424. LUT 420 may store programmable μcode, such as programmable μcode 210 shown in FIG. 2. Control block 422 may be configured to generate an instructions flow according to the function(s) selected (enabled) by function enable generator 414. For example, control block 422 may scan for enabled functions, by starting from a function associated with a left-most '1' (e.g., an enabled indication as opposed to a '0' disabled indication) into a "function_en" bus (see FIGS. 5A and 5B) until a function associated to a right-most '1' into the same "function_en" bus is reached. Core block 424 may be configured to elaborate the data according to the instructions (stored in LUT 420). In general, core block 424 may include one or more I/O registers, at least one arithmetic logic unit (ALU) and an operand selector (not shown). In some examples, a random access memory (RAM) (not shown) may be in electronically coupled to core block 424, such as external memory 114 (FIG. 1). Elaboration results from DSP component 414 may be sent to at least one output register, such as output register 116 (FIG. 1).

Referring to FIGS. 5A and 5B, DSP 516 illustrates an example embodiment of DSP component 418. DSP 516 illustrates "ctrl_idle" control line which indicates whether an operation status of DSP 516 is idle (or busy). Although not shown, DSP 516 may include one or more additional control lines, such as for transmitting elaboration results, for a handshaking process and the like.

Referring to FIG. 4, low priority event manager 426 may be configured trigger DSP component 418, under particular conditions, to elaborate one or more low priority functions from among one or more external sources (e.g., sensors, microprocessors, other external blocks, etc.). Low priority event manager 426 may monitor an operation status of DSP component 418 and a storage status of event FIFO 410 (e.g., directly via event FIFO 410 and DSP component 418, indirectly via event read controller 412). When the operation status of DSP component 418 indicates an idle status (e.g., via the "ctrl_idle" control line shown in FIGS. 5A and 5B), and when a storage status of event FIFO 410 indicates an empty status (e.g., via the fifo_empty control line shown in FIGS. 5A and 5B), low priority event manager 426 may transmit a request to DSP component 418 to elaborate low priority function(s) from least one external source. For example, referring to FIGS. 5A and 5B, low priority event manager 426 may cause FEG 514 to transmit a at least one data packet (containing a command code and data for processing) to DSP 516 via the "trigger" control line, for elaboration by ESP 516.

Referring to FIGS. 5A and 5B, in operation, each independent event source (e.g., among event sources 214 shown in FIG. 2) may generate an event. Each event may be sent to signal path interface 502 with a handshaking protocol such as a valid/ready protocol. Signal path interface 502 may receive the event(s), at event source I/O(s) 504. The event(s) may be pushed to FIFO component 506 and processed by DSP 516.

More specifically, the event(s) may be pushed to event FIFO 510 via EPM 508, where EPM 508 may be configured to manage possible concurrent writes to the FIFO. EPM 508 may also generate "ready" signals back to event source I/O(s) 504 as soon as a corresponding event has been written in event FIFO 510. As discussed above, EPM 508 may be configured to push all of the incoming events to event FIFO 510, respecting (first) a temporal order of incoming events and (second) using a hard-coded event priority ranking when events occur at a same time.

As soon as ERC 512 determines that DSP 516 is idle, ERC 512 may read the next FIFO element from event FIFO 510 (when event FIFO 510 is not empty) and may send the FIFO element to FEG 514. FEG 514 may decode and process the FIFO element, to generate one or more function enable signals associated with the FIFO element. FEG 514, may send the FIFO element (via the "data_in" control line) and corresponding function enable signal(s) (via the "function_en" control line) to DSP 516, for elaboration by DSP 516. In some examples, if event FIFO 510 is empty and DSP 516 is idle, low priority event manager 426 (FIG. 4) may request operation of DSP 516 on low priority data, for example, by utilizing the "trigger" control line via FEG 514.

Referring to FIG. 6, digital waveforms 600 are shown for valid/ready handshaking signals associated with event source I/O(s) 504-1 (event source 0), 504-2 (event source 1), 504-3 (event source 2) and 504-4 (event source 3) with respect to a clock signal "clk" of signal path component 500. The different number of clock pulses associated with the various "valid" waveforms illustrate the asynchronous nature of each event source.

Figure 7:
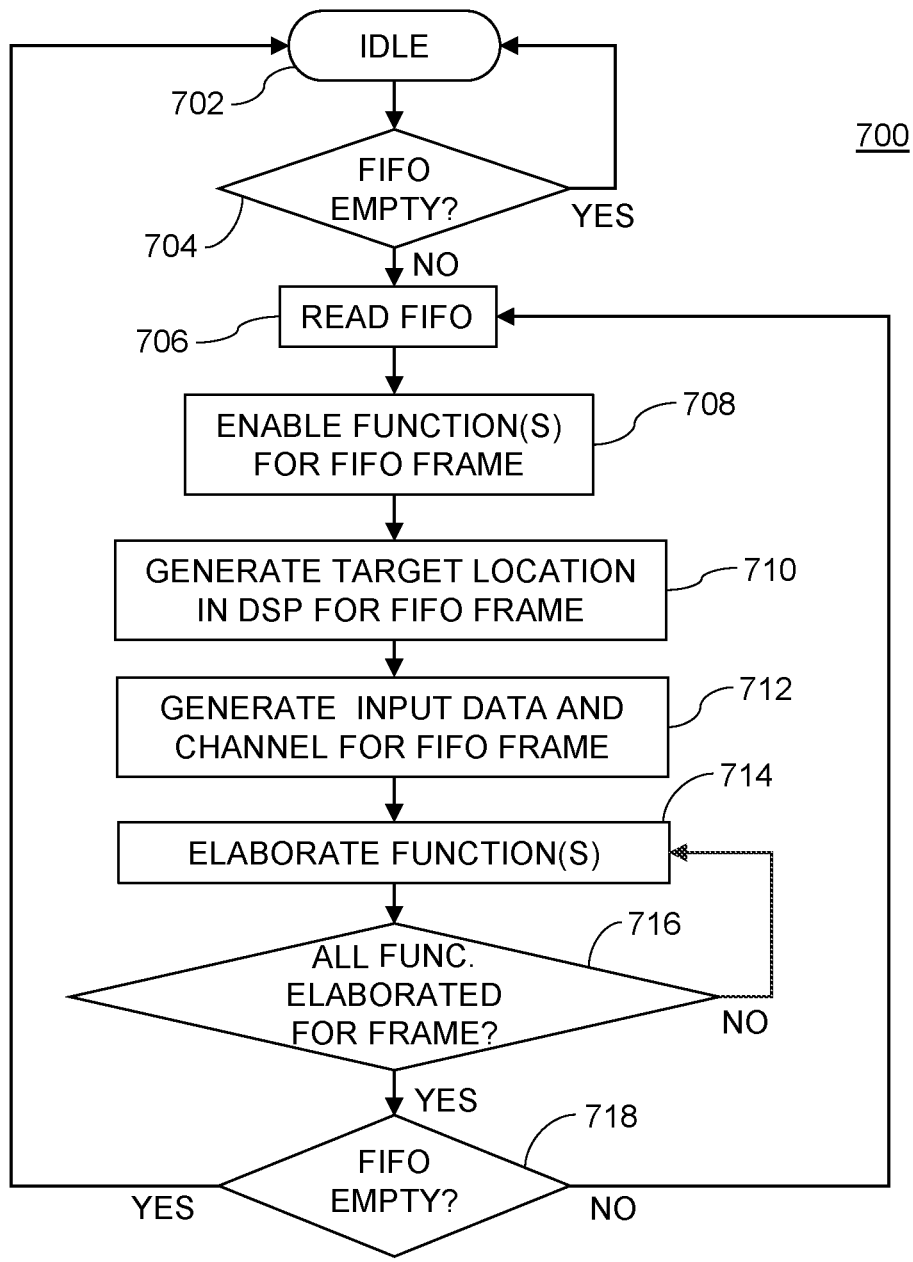
FIG. 7 is a flowchart diagram illustrating a method of processing events stored in a first-in first out (FIFO) component by a digital signa path component, according to an aspect of the present disclosure.

Referring next to FIGS. 4 and 7, a flowchart diagram is shown illustrating example method 700 of processing events stored in event FIFO 410 by signal path component 400. At step 702, event read controller 412 determines that DSP component 418 is idle (e.g., based on monitoring an operation status of DSP component such as via an idle control line). At step 704 event read controller 412 determines whether event FIFO 410 is empty, such as by based on a storage status of event FIFO 410 (e.g., via monitoring an empty status via a FIFO empty control line).

When, at step 704, it is determined that event FIFO 410 is empty, step 704 proceeds to step 702.

When at step 704, it is determined that event FIFO 410 is not empty, step 704 proceeds to step 706. At step 706, event read controller 412 may read a particular event from event FIFO 410, and may send the particular event to function enable generator 414.

At step 708, function enable generator 414 may enable one or more functions (from among a set of predefined functions stored in LUT 416, associated with the particular event, and may generate one or more corresponding function enable signals. At step 710, function enable generator 414 may generate a target location in DSP component 418 for a FIFO frame (e.g., the particular event read from event FIFO 410 at step 706). At step 712, function enable generator 414 may generate input data (e.g., from the particular event) and a data channel for the FIFO frame (e.g., the particular event) and may send the input data and function enable signal(s) to DSP component 418.

At step 714, DSP component 418 may elaborate the input data (e.g., data for the particular event) according to the function(s) enabled by the function enable signal(s) for the FIFO frame (e.g., the particular event), in accordance with μcode stored in LUT 420. At step 716, it is determined whether all of the enabled functions have been elaborated for the FIFO frame (e.g., the particular event). When, at step 716, at least one enabled function remains to be elaborated for the FIFO frame, step 716 proceeds to step 714.

When, at step 716, it is determined that all of the enabled functions have been elaborated by DSP component 418, step 716 proceeds to step 718. At step 718, event read controller 412 determines whether event FIFO 410 is empty.

When, at 718, it is determined that event FIFO 410 is empty, step 718 proceeds to step 702, and event read controller 412 may monitor an operation status of DSP component 418. When it is determined that event FIFO 410 is not empty, step 718 may proceed to step 706, and event read controller 412 may read the next available event from event FIFO 410. It is understood that a maximum elaboration latency of the input data or an event may depend on the system. For example, on an ODR event, all of the processing of the input data by DSP component 418 should be completed before a next ODR tick so that the data are ready for a next ODR frame to be sent to the output register.

Figure 8:
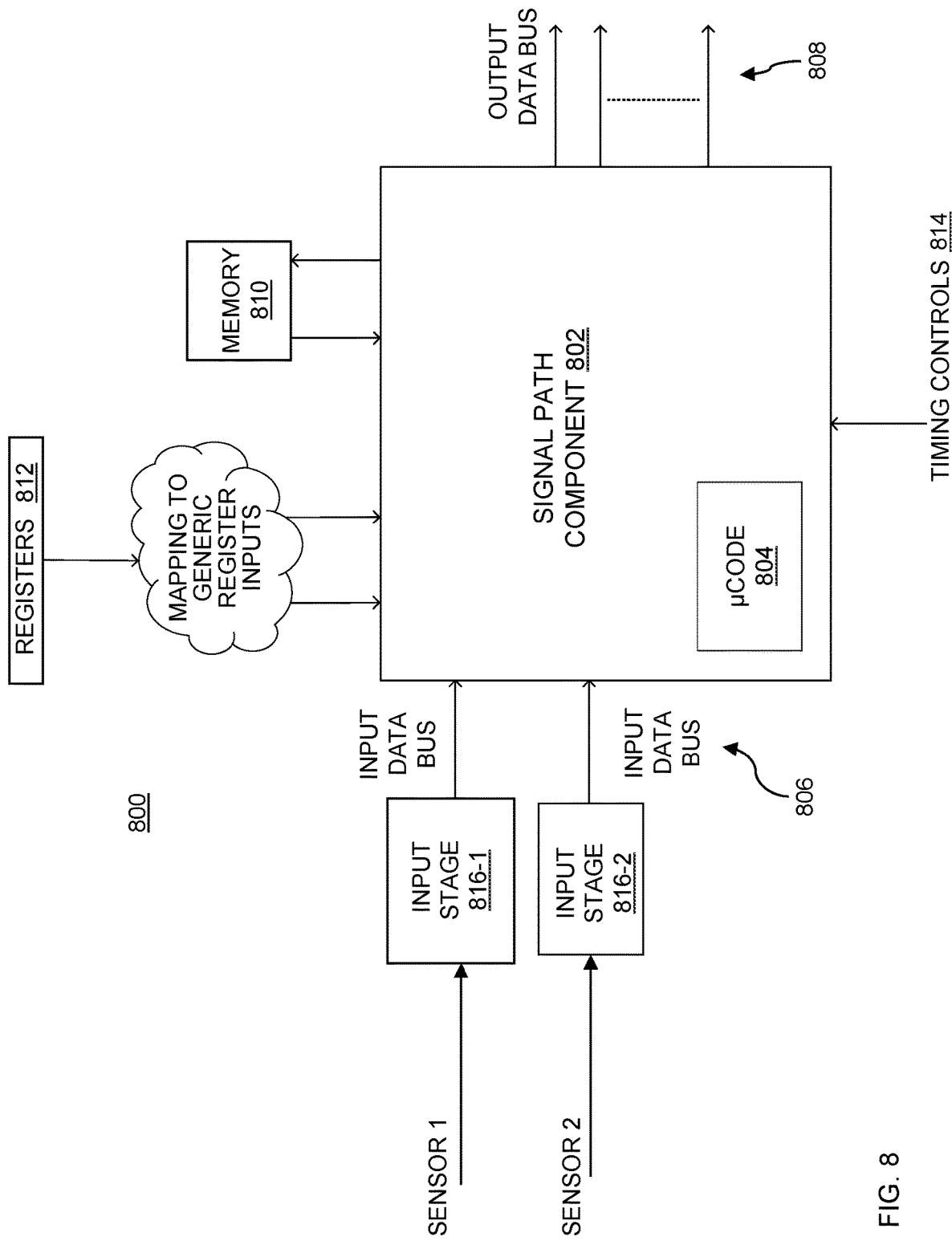
FIG. 8 is a functional block diagram of an example mixed signal system having one digital signal path component, according to an aspect of the present disclosure.
Figure 9:
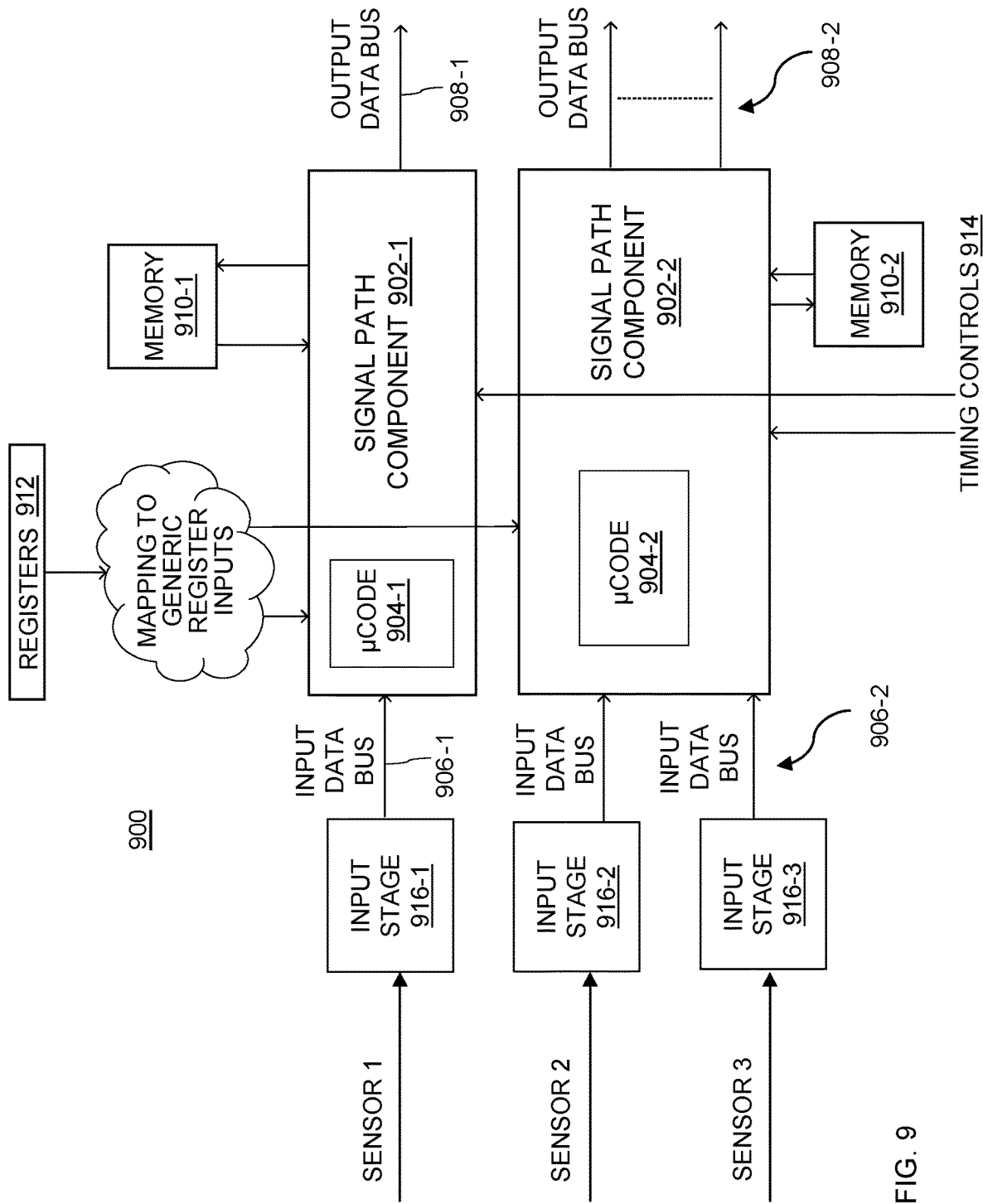
FIG. 9 is a functional block diagram of an example mixed signal system having two digital signal path components, according to an aspect of the present disclosure.
Figure 10:
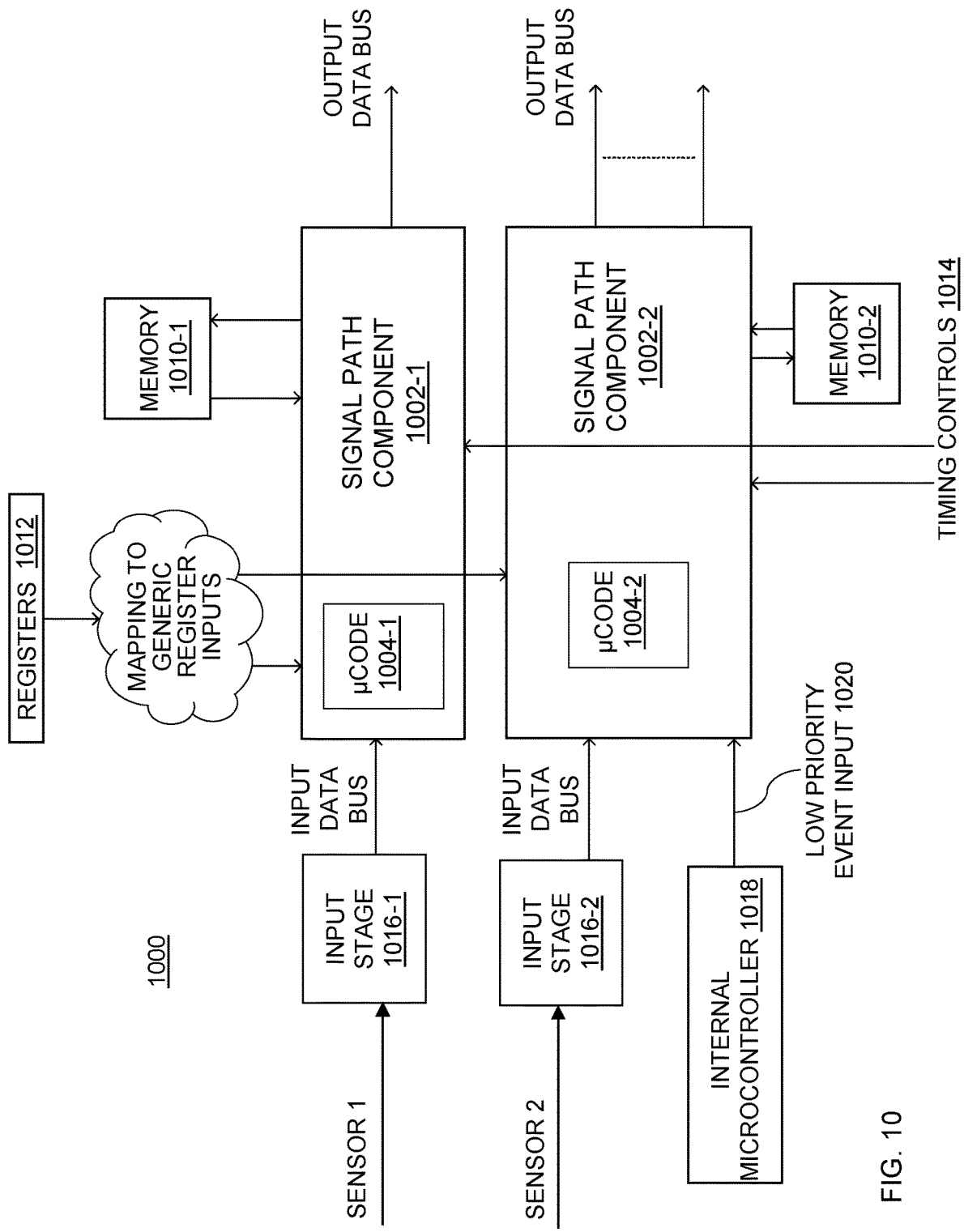
FIG. 10 is a functional block diagram of an example mixed signal system including a microcontroller for handling low priority events, according to an aspect of the present disclosure.

Referring next to FIGS. 8-10, example configurations of mixed signal systems according to aspects of the present disclosure are described. In particular, FIG. 8 is a functional block diagram of example mixed signal system 800 having one digital signal path component 802; FIG. 9 is a functional block diagram of example mixed signal system 900 having two digital signal path components 902-1 and 902-2; and FIG. 10 is a functional block diagram of example mixed signal system 1000 including internal microcontroller 1018 for handling low priority events 1020.

Referring to FIG. 8, mixed signal system 800 may include a single digital signal path component 802 (also referred to herein as signal path component 802) having μcode 804, input data bus 806 and output data bus 808. Signal path component 802 may be electrically connected to external memory 810, and may include a mapping to inputs of registers 812. Signal path component 802 may receive one or more timing controls 814. Signal path component 802 may be configured to receive two mixed signals (which may include asynchronous events) over input data bus 806, from Sensors 1 and 2, via respective input stages 816-1 and 816-2. Signal path component 802 may store events from Sensors 1 and 2, and may process the events via a DSP component (not shown) as described herein (such as with respect to FIG. 4), and may output elaboration results via output data bus 808.

Referring to FIG. 9, mixed signal system 900 may include two digital signal path component 902-1 and 902-2 (also referred to herein as signal path components 902). Each signal path component 902 may include respective μcode 904 (e.g., 904-1, 904-2), input data bus 906 (e.g., 906-1, 906-2) and output data bus 908 (e.g., 908-1, 908-2). Each signal path component 902 may be electrically connected to a respective external memory 910 (e.g., 910-1, 910-2). Signal path components 902 and may include a mapping to inputs of registers 912, and may receive one or more timing controls 914. Signal path component 902-1 may be configured to receive a sensor signal over input data bus 906-1, from Sensor 1, via input stage 916-1. Signal path component 902-2 may be configured to receive two sensor signals over input data bus 906-2, from Sensors 2 and 3 (which may include asynchronous events), via respective input stages 916-2 and 916-3. Signal path component 902-1 may store events from Sensor 1, and may process the events via a DSP component (not shown) as described herein (such as with respect to FIG. 4), and may output elaboration results via output data bus 908-1. Signal path component 902-2 may store events from Sensors 2 and 3, and may process the events via a DSP component (not shown) as described herein (such as with respect to FIG. 4), and may output elaboration results via output data bus 908-2.

FIG. 10 mixed signal system 1000 may include two digital signal path component 1002-1 and 1002-2 (also referred to herein as signal path components 1002). Signal path components 1002 are similar to signal path components 902 (FIG. 9). Each signal path component 1002 may include respective μcode 1004 (e.g., 1004-1, 1004-2), an input data bus and an output data bus. Each signal path component 1002 may be electrically connected to a respective external memory 1010 (e.g., 1010-1, 1010-2). Signal path components 1002 and may include a mapping to inputs of registers 1012, and may receive one or more timing controls 1014.

Signal path component 1002-1 may be configured to receive a sensor signal from Sensor 1, via input stage 1016-1. Signal path component 1002-1 may store events from Sensor 1, and may process the events via a DSP component (not shown) as described herein (such as with respect to FIG. 4), and may output elaboration results via the output data bus.

Signal path component 1002-2 may be configured to receive a sensor signal from Sensor 2, via input stage 1016-2. Signal path component 1002-2 may also be configured to receive low priority event input 1020 from internal microcontroller 1018. Signal path component 1002-2 may store events from Sensor 2, and may process the events via a DSP component (not shown) as described herein (such as with respect to FIG. 4), and may output elaboration results via the output data bus. Signal path component 1002-2 may also trigger the DSP component to process (e.g., elaborate) low priority event input 1020 (from internal microcontroller 1018) when the DSP component is idle and the event FIFO is empty, and may output the elaborated results via the output data bus.

Next, an implementation of a HW-programmable digital signal path component according to the present disclosure was compared to a conventional signal path design, for a group of three mixed signals (accelerometer sensor, gyroscope sensor and user signal paths). The conventional signal path design includes three separate custom hardware DSP blocks, with each block running at about 1 MHz. In the conventional design, the signal path component has a total area of about 125685 and a total power of about 18.9 uW (memories about 6.5 uW). In contrast, the HW-programmable digital signal path component includes a single (programmable) DSP, executing the same operations as the conventional design, and running at about 4 MHz, while providing a significant savings in total area.

While the present disclosure has been discussed in terms of certain embodiments, it should be qualified that the present disclosure is not so limited. The embodiments are explained herein by way of example, but there are numerous modifications, variations and other embodiments that may be employed that would still be within the scope of the present disclosure.

What is claimed:

1. A system comprising:
   a mixed signal component comprising a group of sensor devices, the mixed signal component configured to generate one or more events from among the group of sensor devices; and
   at least one reconfigurable signal path component in electronic communication with the mixed signal component and configured to receive the one or more events, the at least one reconfigurable signal path component comprising:
      a control unit component comprising a programmable function enable mechanism, the control unit component configured to distribute the one or more received events in combination with one or more functions among a set of predefined functions enabled by the programmable function enable mechanism, and
      a digital signal processor (DSP) component configured to perform one or more operations associated with the distributed one or more events in accordance with the one or more enabled functions.

2. The system of claim 1, wherein the programmable function enable mechanism comprises programmable microcode stored in at least one look up table (LUT), the programmable microcode including instructions for enabling implementation of the one or more functions among the set of predefined functions by the DSP component.

3. The system of claim 1, wherein the DSP component comprises programmable microcode stored in at least one look up table (LUT), such that the DSP component is reconfigurable.

4. The system of claim 1, further comprising at least one external memory coupled to the at least one reconfigurable signal path component.

5. The system of claim 1, wherein the at least one reconfigurable signal path component includes two or more reconfigurable signal path components in electronic communication with the mixed signal component.

6. The system of claim 1, wherein the mixed signal component further comprises at least one input component configured to generate at least one event among the one or more events.

7. The system of claim 1, wherein the control unit component comprises:
   an event first in, first out (FIFO) component configured to store the received one or more events in a predefined sequence; and
   a function enable generator comprising the programmable function enable mechanism, the function enable generator configured to generate one or more function enable indications corresponding to the one or more functions.

8. The system of claim 7, wherein the function enable generator is configured to distribute the stored one or more events to the DSP component together with the one or more function enable indications according to the predefined sequence and based on the one or more operations to be performed by the DSP component in the predefined sequence.

9. The system of claim 7, wherein the group of sensor devices include different timing constraints such that the generated one or more events comprise one or more asynchronous events, the event FIFO component configured to arrange the one or more asynchronous events for storage in the FIFO component, and schedule distribution of the one or more asynchronous events according to the predefined sequence.

10. The system of claim 9, wherein the FIFO component further comprises:
    an event priority manager configured to generate the predefined sequence and push the one or more asynchronous events according to the predefined sequence, the predefined sequence generated according to at least one of a temporal order and a predefined priority ranking of the one or more asynchronous events;

an event FIFO component configured to store the one or more pushed asynchronous events according to the predefined sequence, to form one or more stored events; and an event read controller configured to read at least one event among the one or more stored events in the event FIFO component according to the predefined sequence and send the at least one event to the function enable generator, when the DSP component is idle.

11. The system of claim 7, wherein the system further comprises an event manager configured to send a request to the DSP component for operation of at least one function, said request being generated when the DSP component is idle and the FIFO component is empty, the at least one function having a predefined priority and being received from at least one external source.

12. The system of claim 1, wherein the control unit component comprises a configuration manager component configured to sample one or more input settings of the mixed signal component.

13. The system of claim 1, wherein the at least one reconfigurable signal path component is configured to be programmed via metal.

14. A method, comprising:
receiving, by at least one reconfigurable processing component, one or more events generated from among a group of sensor devices comprising a mixed signal component;

enabling, by a programmable function enable mechanism of the of the at least one reconfigurable processing component, one or more functions among a set of predefined functions;

distributing, by a control unit component of the at least one reconfigurable processing component, the one or more received events in combination with the one or more functions enabled by the programmable function enable mechanism, and performing, by a digital signal processor (DSP) component of the at least one reconfigurable processing component, one or more operations associated with the distributed one or more events in accordance with the one or more enabled functions.

15. The method of claim 14, the method further comprising:
storing, an event first in, first out (FIFO) component of the control unit component, the received one or more events in a predefined sequence;

generating, by a function enable generator of the control unit component, the function enable generator configured to generate one or more function enable indications corresponding to the one or more functions, the function enable generator comprising the programmable function enable mechanism; and distributing, by the function enable generator, the stored one or more events to the DSP component together with the one or more function enable indications according to the predefined sequence and based on the one or more operations to be performed by the DSP component in the predefined sequence.

16. The method of claim 15, the method further comprising:
generating, by an event priority manager of the FIFO component, the predefined sequence according to at least one of a temporal order and a predefined priority ranking of the one or more events;

pushing, by the event priority manager, the one or more events to an event FIFO component of the FIFO component according to the predefined sequence;

storing, by the event FIFO component the one or more pushed events according to the predefined sequence, to form one or more stored events; and when the DSP component is idle:
reading, by an event read controller of the FIFO component, at least one event among the one or more stored events in the event FIFO component according to the predefined sequence; and sending, by the event read controller, the at least one event to the function enable generator.

17. The method of claim 15, wherein the group of sensor devices include different timing constraints such that the generated one or more events comprise one or more asynchronous events, the method further comprising:
arranging, by the FIFO component, the one or more asynchronous events for storage in the FIFO component according to the predefined sequence, and scheduling, by the FIFO component, distribution of the one or more asynchronous events according to the predefined sequence.

18. The method of claim 14, the method further comprising:
receiving, by an event manager of the at least one processing component, a processing request for at least one function from at least one external source; and determining, by the event manager, that the at least one function has a predefined priority; and when the DSP component is idle and the FIFO component is empty:
generating, by the event manager, responsive to said determining, a request to the DSP component for operation of at least one function; and sending, by the event manager, the request to the DSP component.

19. The method of claim 14, the method further comprising:
storing, in at least one look up table (LUT), programmable microcode associated with the programmable function enable mechanism, the programmable microcode including instructions for enabling implementation of the one or more functions among the set of predefined functions by the DSP component.

20. The method of claim 14, the method further comprising:
storing, in at least one look up table (LUT), programmable microcode associated with the DSP component, the DSP component being reconfigurable via the programmable microcode.

* * * * *